May 15, 1962 R. F. STEWART 3,034,871
METHOD OF FORMING SILICON INTO INTRICATE SHAPES
Filed Dec. 29, 1958

INVENTOR
Richard F. Stewart

BY Stevens, Davis, Miller & Mosher
ATTORNEYS 3,034,871
METHOD OF FORMING SILICON INTO
INTRICATE SHAPES
Richard F. Stewart, Richardson, Tex., assignor to Texas
Instruments Incorporated, Dallas, Tex., a corporation
of Delaware
Filed Dec. 29, 1958, Ser. No. 783,526
9 Claims. (Cl. 23—301)

This invention relates generally to the fabrication of high temperature materials into shapes of intricate design, and more particularly to an improved method of forming silicon or germanium into a complex shape by application of a temperature gradient to an alloy of one of these metals with gold, silver or tin.

It is well known that alloys often exhibit the property of melting at lower temperature than their constituent materials. An alloy of gold and silicon, for example, melts at 370° C. when alloyed in eutectic proportions of approximately 31 atomic percent silicon and 69 atmoic percent gold. Thus, the eutectic has a melting point considerably below the melting points of pure gold and pure silicon which are approximately 1063° C. and 1420° C. respectively. If an alloy composition comprises a greater proportion of siilcon than the eutectic proportion, its melting point will be higher than 370° C. For example, a composition having 73 atomic percent silicon will melt at approximately 1200° C. If such composition is progressively cooled below 1200° C., it will deposit out crystals of silicon and the melt will change in composition to lower the proportion of silicon until the eutectic proportion of 31 atomic percent is reached at a temperature of 370° C. In the process of cooling, from 1200° C. to say 600° C., essentially pure silicon will be deposited from the melt in a quantity equal to the difference between 73 atomic percent and 35 atomic percent of silicon. Conversely, if gold is placed in contact with silicon and the temperature raised to 370° C. and above, the eutectic alloy will form in molten state with a tendency to dissolve more silicon with increasing temperature. Under these circumstances, if a temperature gradient is applied to gold and silicon in contact with the lower temperature equal to or above the eutectic temperature, a molten zone will be formed at the interface layer. This zone continues to dissolve silicon until the liquid composition is saturated at the lower temperature. When the liquid reaches this concentration at the cool side of the zone, the silicon will continue to dissolve at the hot side, increasing the length of the molten zone. As more silicon is dissolved, the concentration at the cool side of the zone exceeds the saturation limit and pure silicon is deposited in crystalline form. Thus, in effect, the molten zone travels from the lower temperature region toward the higher temperature region depositing pure silicon behind as it moves.

The present invention utilizes this temperature gradient technique for casting objects of intricate shape from materials which are difficult and expensive to work by ordinary machining processes or are likely to be unduly contaminated if melted and cast at their normal high temperatures.

It is, accordingly, a primary object of the invention to provide a new and improved method of forming silicon, germanium and other high temperature materials into intricate or complex shapes such as infra-red domes, windows, and lenses.

Another object of the invention is to provide an improved method of forming devices having non planar surfaces which avoids milling, grinding or other machining operations with their consequent loss of materials.

A further object of the invention is to provide a method of making items of complex shape which requires relatively simple apparatus with stationary heat generating means and without moving parts.

A still further object of the invention is to provide a simple and inexpensive method for forming intricate shapes from high temperature materials and which lessens the danger of contaminating such materials.

The novel features that are considered characteristic of the invention are set forth with particularly in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures and in which:

Figure 1:
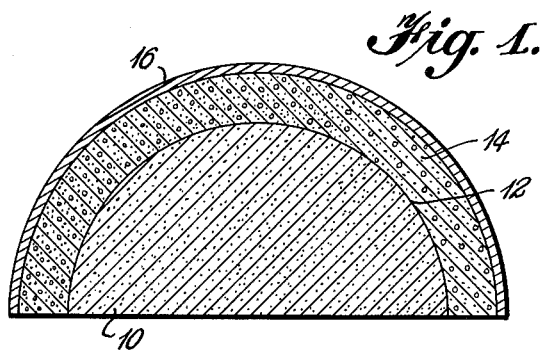
FIGURE 1 is a digarammatic sectional view of silicon particles being formed into an infra-red dome by the method of the invention.
Figure 2:
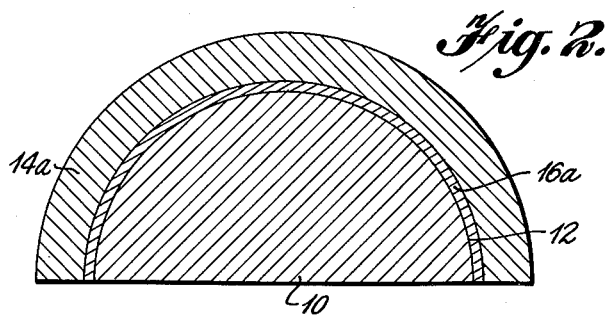
FIGURE 2 is a view similar to FIGURE 1 showing the silicon dome after formation.

Referring now to the drawings, FIGURES 1 and 2 schematically illustrate the process of the instant invention as applied to the casting of a thin, semispherical dome from silicon and suitable for the passage of a high percentage of infra-red radiation in a detection system. For the first step of the process, a mold 10 is formed of graphite, quartz or other suitable material which will not react with silicon. The surface 12 of the mold is semispherical and in the desired shape of the dome to be cast. A thin, mating mold part or shell 16, also semispherical in shape, is then made of gold, silver, tin or other material having a suitable eutectic temperature with silicon and a low solubility in silicon. A charge 14 of granulated or powdered silicon of requisite purity is placed between the mold parts 10 and shell 16. Heat is applied to the graphite mold 10 so that a uniform high temperature, less than the melting point of silicon, is obtained on the mold surface 12. Preferably, this temperature may be approximately 1200° C. Heat is also applied to the mating shell 16 so that its temperature remains constant at a lower temperature, as for example 600° C. Since the eutectic temperature of gold and silicon is approximately 370° C., the interface layer of gold and silicon will fuse into a molten zone which will travel toward the high temperature surface 12. The rate of travel is dependent on a number of factors including the temperature gradient, diffusivity of the molten liquid, the heat fusion conductivity of the liquid as compared to that of a solid, and others. A typical temperature gradient for a high gold range zone traversing silicon may vary from 50° C. to 300° C. per centimeter and a typical travel rate of a molten zone is in the range of about 1 millimeter per hour.

The graphite mold surface 12 is kept at a higher temperature than the gold shell 16, the complete assembly being thus held above the gold-silicon eutectic temperature. After a sufficient time has passed with the heat thus applied, the gold shell 16 will have passed entirely through the granulated silicon 14 which silicon will be deposited in a continuous crystalline layer 14a (not necessarily single crystal) in the shape of the surface 12. FIG. 2 illustrates the completion of this action during which the gold shell 16, has moved to a position 16a adjacent the graphite mold surface 12 and the deposited crystalline silicon 14a, in the semispherical form is outside the gold layer. It should be noted that employemnt of the temperature 1200° C. for the upper value of the temperature gradient provides a temperature at the graphite mold which is higher than the melting point, approximately 1060° C., of gold. Thus, at the end of the casting operation, the gold, alloyed with some silicon, is in molten state and may be easily drained off for recovery and reuse. Alternatively, the silicon dome may be easily separated from the molten gold layer by lifting and removal. The amount of gold left in solution in the crystallized silicon is extremely small, usually less than one part gold in 100 million parts of silicon.

Figure 3:
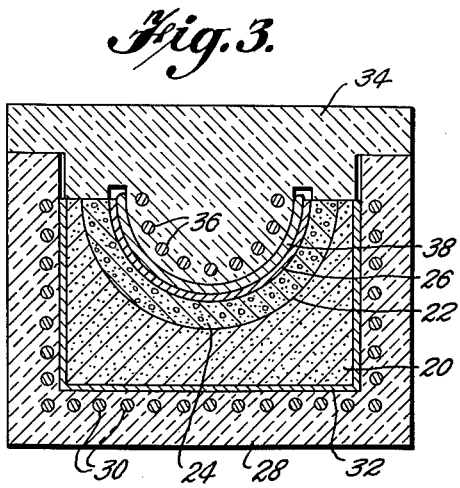
FIGURE 3 is a diagrammatic sectional view of a furnace and mold suitable for carrying out the method of the invention.
Figure 4:
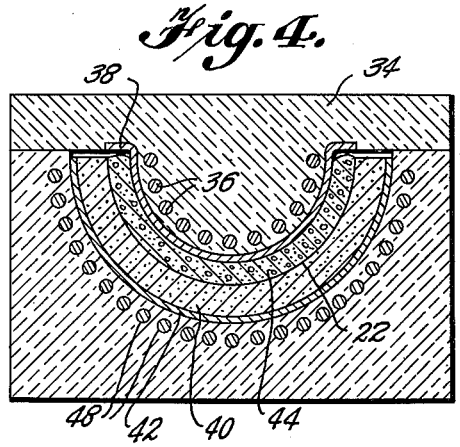
FIGURE 4 is a view similar to FIGURE 3 of modified apparatus suitable for carrying out the improved method.

In FIGS. 3 and 4 are partially illustrated preferred embodiments of furnace and mold apparatus suitable for applying the temperature gradient. The graphite mold 20 in FIG. 3 is shaped in the form of a crucible with a concave spherical surface 22 in which granulated or powdered silicon 24 may be placed. The crucible mold 20 is preferably seated with a close fit in an electric furnace 28 having insulated walls and a metal or other good heat conducting liner 32 for conduction of heat to the outer surfaces of the mold 20. Insulated resistors 30 are imbedded in the furnace walls for generating heat which is conducted to the mold 20 through the liner 32 so that an appropriate temperature may be maintained at the mold surface 22. Thermostatic controls, not shown, may be used to maintain this temperature constant. The gold semisphere 26 resting on silicon 24 comprises the charge for the furnace. The furnace cover 34 is seated on the open top of the furnace. The cover 34 is preferably formed with a dependent semispherical heat-conducting liner 38 which mates with the gold layer 26. Liner 38 is heated by electrically insulated resistor 36.

The described apparatus will serve to apply the temperature gradient of 1200° C. at surface 22 and 600° C. at outer surface of the gold layer 26 for the time necessary for the gold layer 26 to pass through the silicon and reach the surface 22 leaving crystalline silicon in dome shape adjacent the cover layer 38. Depending upon the purity required, the furnace may be operated with an inert gas atmosphere or with an internal vacuum. The metal liner 38 is preferably of a material such as tantalum, which does not react with silicon. Upon conclusion of the casting operation, the cover 34 is lifted and the silicon dome removed leaving the molten gold alloyed with some silicon which may be drained and reused.

In FIG. 4, the mold 40 is formed as a semispherical shell so that the radial distance from its outer to its inner surface is the same at all points. The furnace liner 42 is shaped to mate with the outer surface of the mold and is positioned in good heat-conducting relation thereagainst. Electric heater wire 48 is also shaped to conform with the liner 42. In this way, equal heat paths from the heater to the inner surface 22 of the mold are provided which enable the maintenance of an equal temperature on all parts of surface 22. The same furnace cover 34 may be used as illustrated in FIG. 3. However, the charge 44 comprises a homogeneous mixture of powdered or granulated silicon and gold. The charge is seated between the metal liner 38 and the surface 22 of the graphite mold. Again, a higher temperature is applied to the surface 22 while the lower temperature is applied to the charge at the inner surface of liner 38. The operation of the modified furnace with this charge will be the same as previously described in that the powdered gold and silicon will fuse into a molten zone adjacent the liner 38 and this zone will travel toward the higher temperature, mold surface 22 until substantially all of the gold is deposited next to the mold surface while the silicon crystallizes out behind in a semispherical dome.

While the process has been described with reference to the use of a temperature gradient in a vertical direction, it is not limited to such. The molten zone will be formed and travel to the higher temperature surface even though the surfaces are positioned apart horizontally or in other directions differing from the vertical. It should be apparent also that the specific apparaus for a method of obtaining the temperature gradient described are not limiting since the form of the mold may obviously be varied and the heat may be applied by convection, radiation, or induction rather than by conduction. The described method makes possible the casting of intricate shapes having many applications for semiconductor uses and as windows or lenses for infra red radiation. In such applications, the shapes or forms desired are often mechanically impossible to make by milling, grinding or otherwise shaping by machine due to the hardness and brittleness of semiconductor materials. With the method of the present invention, complex shapes having non-planar surfaces may be easily cast without waste of material as would result with grinding or milling operations. Since semiconductor materials of requisite purities are expensive, the elimination of wastage is an extremely important factor.

Although certain specific embodiments of the invention have been shown and described, it is obvious that many modifications thereof are possible. The invention, therefore, is not to be restricted except insofar as is necessitated by the prior art and by the spirit of the appended claims.

What is claimed is:

1. The process of forming a first material into a nonplane shape comprising forming a mold in the desired shape from a material which does not react with the first material, placing a first material against said mold, placing a thin shell of a second material formed in the desired shape and which mates with the mold against said first material, the second material being capable of forming a fusible mixture with the first material and such that a solution of the second material in the first material has a melting point lower than that of the first material, placing a mating mold in engagement with said thin shell, and producing a temperature gradient between said mold and said thin shell of the second material by maintaining said mold at a higher temperature of less than the melting point of the first material and maintaining said mating mold at a lower temperature above the eutectic temperature of the fusible mixture of the first and second materials, whereby a molten zone on a monplane shape containing a solution of the second material in the first material is formed in the region of contact of the first material with the shell of second material, said molten zone progressively moving toward the higher temperature area of the mold to deposit the second material thereagainst while progressively melting and recrystallizing the first material in the shape of the mold outside of said second material.

2. The process of forming silicon into a relatively thin, nonplane shape comprising forming a mold in the desired shape from a material which does not react with silicon, placing a charge of silicon against said mold, placing a thin shell of gold formed in the desired shape and which mates with the mold against said charge, and applying a temperature gradient between said mold and said thin shell of gold such that the higher temperature of the mold is less than the melting point of silicon and the lower temperature of the gold is above the eutectic temperature of the fusible mixture of the silicon and gold, whereby a molten zone containing a solution of gold in silicon is formed in the region of contact of the charge with the shell of gold, said molten zone progressively moving toward the higher temperature area of the mold to deposit the gold thereagainst while progressively melting and recrystallizing the silicon in the shape of the mold outside of the said gold.

3. The process of forming silicon into an intricate shape according to claim 2 wherein said temperature gradient applied between the mold and the gold is approximately a higher temperature of 1200° C. and a lower temperature of approximately 600° C.

4. The process according to claim 2 wherein at the completion of movement of said molten zone to a position next to the mold substantially all of said gold is recovered in molten form for reuse in subsequent forming operations.

5. The process of forming a first material into a nonplane shape comprising forming a mold in the desired shape from a material which does not react with the first material, placing a charge against said mold, said charge comprising said first material and a second material, the second material being capable of forming a fusible mixture with the first material and such that a solution of the second material in the first material has a melting point lower than that of the first material, and producing a temperature gradient arcoss said charge such that the higher temperature of the mold is less than the melting point of said first material and the lower temperature of the outer surface of said charge is above the autectic temperature of the fusible mixture of the first and second materials, whereby a molten zone containing a solution of the second material in the first material is formed at the outer surface of said charge, said molten zone progressively moving toward the higher temperature area of the mold to deposit the second material thereagainst while progressively melting and recrystallizing the first material in the shape of the mold outside of said second material.

6. The process of forming silicon into a relatively thin, nonplane shape comprising forming a mold in the desired shape from a material which does not react with silicon, placing a charge comprising a homogeneous mixture of gold and silicon against said mold, and producing a temperature gradient between said mold and the outer surface of said homogeneous mixture such that the higher temperature of the mold is less than the melting point of the silicon and the lower temperature of the outer surface of said charge is above the eutectic temperature of the fusible mixture of silicon and gold, whereby a molten zone containing a solution of gold in silicon is formed at the outer surface of said charge, siad molten zone progressively moving toward the higher temperature area of the mold to deposit a molten layer of gold alloy thereagainst while progressively melting and recrystallizing the silicon of the charge in a mold shaped deposit outside of the said molten layer of gold alloy.

7. The process according to claim 1 wherein said first material is selected from a group consisting of high temperature, semiconductor materials while said second material is selected from a group consisting of gold, silver and tin.

8. A process of forming silicon into a cylindrical shape comprising the steps of forming a cylindrical mold of quartz, placing a cylindrically-shaped charge comprising a homogeneous mixture of gold and silicon against said mold, placing a dependent mold which mates with said cylindrical mold in engagement with said charge, maintaining said cylindrical mold at a temperature of about 1200° C., and maintaining said dependent mold at a temperature of about 600° C., whereby a cylindrical-shaped molten zone containing a solution of gold and silicon is formed at the outer surface of said charge adjacent said dependent mold, said molten zone progressively moving toward the higher temperature area of said charge to deposit a molten layer of gold alloy against said cylindrical mold while progressively melting and recrystallizing the silicon of the charge in a mold-shaped deposit outside of the molten layer of gold alloy.

9. A process of forming silicon into a cylindrical shape comprising the steps of forming a cylindrical mold of quartz, placing a cylindrically-shaped charge of silicon against said mold, placing a thin cylindrical shell of gold against the silicon, placing a dependent mold which mates with said cylindrical mold in engagement with said shell of gold, maintaining said cylindrical mold at a temperature of about 1200° C., and maintaining said dependent mold at a temperature of about 600° C., whereby a cylindrically-shaped molten zone containing a solution of gold and silicon is formed in the region of contact of said silicon charge with said shell of gold, said molten zone progressively moving toward the higher temperature area of said silicon charge to deposit a molten layer of gold alloy against said cylindrical mold while progressively melting and recrystallizing the silicon in a mold-shaped deposit outside of the molten layer of gold alloy.

References Cited in the file of this patent
UNITED STATES PATENTS

| | | |
|---|---|---|
| 2,747,971 | Hein | May 29, 1956 |
| 2,877,147 | Thurmond | Mar. 10, 1959 |